United States Patent
Morel et al.

(10) Patent No.: US 8,364,203 B2
(45) Date of Patent: Jan. 29, 2013

(54) METHOD OF DYNAMICALLY ALLOCATING CONTACTS OF A SUBSCRIBER CHIP IN A MOBILE TERMINAL, AND CORRESPONDING SUBSCRIBER CHIP CARD AND MOBILE TERMINAL

(75) Inventors: Olivier Morel, Eterville (FR); Alan Kerdraon, Caen (FR); Olivier Briot, Saint Meloir des Ondes (FR); Philippe Maugars, Ranes (FR)

(73) Assignee: St-Ericsson S.A., Plan-les-Quates (CH)

( * ) Notice: Subject to any disclaimer, the term of this patent is extended or adjusted under 35 U.S.C. 154(b) by 747 days.

(21) Appl. No.: 12/226,084

(22) PCT Filed: Mar. 26, 2007

(86) PCT No.: PCT/IB2007/051052
§ 371 (c)(1),
(2), (4) Date: Mar. 12, 2009

(87) PCT Pub. No.: WO2007/113729
PCT Pub. Date: Oct. 11, 2007

(65) Prior Publication Data
US 2009/0275364 A1 Nov. 5, 2009

(30) Foreign Application Priority Data
Apr. 5, 2006 (FR) ...................... 06 51206

(51) Int. Cl.
*H04B 1/38* (2006.01)
*H04M 1/00* (2006.01)
(52) U.S. Cl. ..................... 455/558; 379/433.09; 710/13; 361/737

(58) Field of Classification Search .................. 455/558, 455/410, 411, 414.1; 379/433.09; 710/13; 361/737
See application file for complete search history.

(56) References Cited

U.S. PATENT DOCUMENTS

| | | | |
|---|---|---|---|
| 5,847,372 A | 12/1998 | Kreft et al. | |
| 6,088,755 A | 7/2000 | Kobayashi et al. | |
| 6,439,464 B1 | 8/2002 | Fruhauf et al. | |
| 6,557,753 B1 * | 5/2003 | Beaujard et al. | 235/375 |
| 6,839,772 B1 * | 1/2005 | Kowalski et al. | 710/5 |
| 7,185,064 B1 * | 2/2007 | Mariana | 709/217 |
| 2003/0102280 A1 * | 6/2003 | Odet et al. | 215/252 |
| 2003/0115442 A1 * | 6/2003 | Whitney | 713/1 |
| 2004/0089717 A1 * | 5/2004 | Harari et al. | 235/441 |
| 2004/0198446 A1 * | 10/2004 | Liu et al. | 455/558 |

(Continued)

FOREIGN PATENT DOCUMENTS

| | | |
|---|---|---|
| FR | 2844078 | 3/2004 |
| JP | 10-334206 | 12/1998 |

(Continued)

*Primary Examiner* — Dominic E Rego
(74) *Attorney, Agent, or Firm* — Howison & Arnott, L.L.P.

(57) ABSTRACT

A contact allocation method for a subscriber smart card (300) in a mobile terminal (100) fitted with said card, the mobile terminal including at least first and second electronic modules (130, 140) suitable for communicating with the subscriber smart card (300) using respective first and second communications protocols. To enable the way in which the contacts of the subscriber smart card (300) are allocated to be managed dynamically, the card is connected to the first and to the second electronic modules (130, 140) in alternation by selectively connecting at least one contact (C4) of said card to the first or to the second electronic module (130, 140).

12 Claims, 5 Drawing Sheets

U.S. PATENT DOCUMENTS

| | | | |
|---|---|---|---|
| 2004/0225796 A1* | 11/2004 | Hanson et al. | 710/301 |
| 2004/0225800 A1* | 11/2004 | Lin | 710/301 |
| 2004/0249625 A1* | 12/2004 | Leaming | 703/27 |
| 2004/0252566 A1* | 12/2004 | Chang et al. | 365/202 |
| 2005/0096087 A1* | 5/2005 | Kim | 455/558 |
| 2005/0266845 A1* | 12/2005 | Aerrabotu et al. | 455/436 |
| 2007/0008140 A1* | 1/2007 | Saarisalo et al. | 340/572.7 |
| 2007/0030511 A1* | 2/2007 | Lee | 358/1.15 |
| 2007/0082661 A1* | 4/2007 | Black et al. | 455/418 |
| 2007/0194945 A1* | 8/2007 | Atkinson | 340/825.72 |

FOREIGN PATENT DOCUMENTS

| | | |
|---|---|---|
| JP | 2003-216899 | 7/2003 |
| WO | WO 01/06443 | 2/2001 |
| WO | WO 2006/111781 | 10/2006 |

* cited by examiner

METHOD OF DYNAMICALLY ALLOCATING CONTACTS OF A SUBSCRIBER CHIP IN A MOBILE TERMINAL, AND CORRESPONDING SUBSCRIBER CHIP CARD AND MOBILE TERMINAL

RELATED APPLICATIONS

This is a U.S. National Phase Application under 35 USC 371 of International Application PCT/IB2007/051052, filed on Mar. 26, 2007.

This application claims the priority of French application no. 06/51206 filed on Apr. 5, 2006, and the content of which is hereby incorporated by reference.

FIELD OF THE INVENTION

The present invention relates to the field of mobile telephony, and more particularly it relates to the functional architecture of a mobile terminal and to managing the electrical contacts of the subscriber smart card present in the terminal.

PRIOR ART

A mobile telephone is made up of various elements (keypad/screen, microphone/loudspeaker, radiocommunication element (e.g. of the global system for mobiles (GSM) type), etc.) that are dedicated to the various functions made available to the user. Amongst these various elements there is a subscriber smart card known as a subscriber identity module (SIM) or as a universal subscriber identity module (USIM), otherwise known as a UMTS integrated circuit card (UICC).

The subscriber smart card is the security element of the mobile telephone made available by mobile telephone operators acting as card issuers. Such a card contains processor means (a microcontroller) and memory means. Typically, the card embodies the telephone subscription within the mobile telephone by providing it with data specific to each subscriber and enabling authentication mechanisms to operate with the network of the operator. It also enables the bearer of the mobile telephone to be authenticated when the personal identification number (PIN) is activated. With present-day subscriber smart cards, there are three contacts that are unused. These are contacts C4, C6, and C8 as defined by the standard ISO 7816-2.

At present, mobile telephone operators are considering simplifying the deployment of their services, and doing so very simply by means of subscriber smart cards that no longer contain only subscription data/algorithms, but also data and applications that enable a telephone to be personalized in a manner specific to the operator as soon as said card is inserted into the telephone. Provision is also being made to simplify changing telephone for a subscriber, with it being possible for practically all of the subscriber's important data (large capacity directory, multimedia messaging service (MMS) data, photographs, . . . ) to be contained in such new generation smart cards. In order to have satisfactory quality of service available, it is necessary to provide the subscriber smart card with a new communications interface that operates at very high speed, known as high speed protocol (HSP), for communication between the application processor of the mobile telephone and the subscriber smart card. This protocol may be constituted, for example, by the universal serial bus (USB) protocol that requires two electrical contacts, or it may be the multimedia card (MMC) protocol that requires three contacts.

Furthermore, mobile telephone operators are also considering offering near-field communication (NFC) services to their clients. For this purpose, mobile telephones are provided with a dedicated antenna (also called a coil) that is integrated in the cover of the telephone and that is connected to an electronic module for near-field communication that enables NFC technology to be implemented.

An NFC electronic module comprises in particular an NFC modem such as the PN 531 TAMA from the supplier Philips™ that generates the contactless analog interface. Amongst the various modes of operation made possible by NFC technology, a so-called "card emulation" mode involves specifically implementing an additional component known as a "security element" that is connected to the NFC modem and that, depending on circumstances, can either be implemented by a dedicated NFC component such as the smart MX circuit from the supplier Philips™, or by the subscriber smart card, providing it is given a new interface for communicating with the NFC modem.

This NFC security component is suitable for storing data and for controlling access and for broadcasting (identification/authentication, encryption) in particular via the NFC communication interface.

In "card emulation" mode, an NFC mobile telephone can store and manage a set of virtual cards suitable for giving access to various different services, such as, for example: secure electronic payment services, services for opening doors or barriers, . . . .

The terminal then replaces physical cards that are usually used, whether with or without contact. To use the service, the user places the mobile telephone fitted with an NFC chip close to an NFC chip reader (also known as a proximity coupling device (PCD) and present in already existing infrastructure such as the contactless cards used for urban mass transport) corresponding to the service it is desired to use (payment terminal, access terminal, etc.).

For this purpose, and when the NFC security element is implemented in the subscriber smart card, it is necessary to host new secrets and algorithms in said subscriber smart card. In addition, it is also necessary to put a new interface into place in order to enable data to be exchanged between the subscriber smart card and the NFC modem that manages the contactless analog interface. Amongst the various protocols that have been developed in the industry, some require two contacts (e.g. the S2C protocol/interface from the supplier Philips™), while others only one (e.g. the single wire protocol (SWP) described by the supplier Axalto).

The number of contacts on a subscriber smart card (SIM/USIM/UICC) card is limited to eight (of which three are still unused), so the options available for changes requiring the use of card contacts will quickly become limited.

The so-called multiplexing technique is a known method that enables a single channel to group together signals or data coming from a plurality of channels (with this being done by a multiplexer) the signals or data possibly having different final destinations. Nevertheless, such a mechanism requires the multiplexed data to be "labeled" with an identifier for its destination so as to make it possible subsequently for the correct data to be delivered to and read by each destination. In addition, multiplexing technology consumes software and hardware resources and does not appear to be adapted to environments that are as constricted as a mobile telephone, and above all as a subscriber smart card.

The solution presently under consideration for reconciling communication between firstly a subscriber smart card with its eight existing contacts and secondly an application processor using a high speed protocol and an NFC module using some other protocol, consists in implementing a USB connection ("Interchip" version) for the high speed protocol, i.e. using two wires, and a one-wire interface for NFC. That solution enables both the application processor and the NFC module to exchange data simultaneously with the subscriber smart card.

Nevertheless, that solution raises implementation problems. "Interchip" type USB ports are not yet present in mobile terminals, thereby raising implementation problems. Furthermore, the interface with the NFC modem (e.g. the S2C interface) is more complex to implement on one wire than on two.

Finally, that solution makes it necessary to use all the remaining free contacts on the subscriber smart card in a permanent and rigid manner, thereby blocking any future possibility for change in the use of the card.

OBJECT AND BRIEF SUMMARY OF THE INVENTION

One object of the present invention is to make it possible to allocate the contacts of a subscriber smart card dynamically between a plurality of modules of the mobile terminal, thus enabling the mobile terminal to use the capabilities of the subscriber smart card in alternation.

This and other objects are attained in accordance with one aspect of the present invention directed to a contact allocation method for a subscriber smart card in a mobile terminal fitted with said card, the mobile terminal including at least first and second electronic modules suitable for communicating with the subscriber smart card using respective first and second communications protocols, wherein the subscriber smart card is connected to the first and second electronic modules in alternation, with at least one contact of said card being connected selectively to said first electronic module or to said second electronic module.

Thus, the invention enables the contacts of the subscriber smart card to be managed dynamically. A given contact of the smart card can be used for exchanging data with a plurality of electronic modules. In this way, adding an electronic module requiring communication with the subscriber smart card does not imply permanently occupying one or more of the contacts of the card, thus making it possible to have a card configuration that can change in the future and allow other electronic modules to be added even when the modules already present are making use of some or all of the available contacts of the card.

In an aspect of the invention, the subscriber smart card also receives a command to use a communications interface corresponding to the communications protocol of the electronic module that is to be connected with said card. Thus, when the electronic modules use communication protocols that are different, the smart card manages its interfaces dynamically so as to use the interface that is appropriate for the module in connection therewith.

In order to connect the first and second electronic modules selectively to said card, it is preferable to use the three contacts that correspond to the unused contacts of the subscriber smart card (the contacts C4, C6, and C8 as defined in the ISO 7816-2 standard).

In an embodiment, the first electronic module is an application processor using a first very high speed communications protocol on at least two wires, and the second electronic module is a near-field communication module using a second communication protocol on at least one wire, at least one contact of the subscriber smart card being connected selectively to said processor or to said module.

Consequently, because the way in which the contacts of the smart card are allocated is managed dynamically by the invention, it is possible for a single mobile terminal to implement both an application processor and an NFC module while using only two contacts of the subscriber smart card.

When the application processor uses an MMC type communications protocol that transmits data on first and second contacts of the subscriber smart card together with a clock signal on a third contact of said card, the subscriber smart card responds to a variation in the duty ratio of the clock signal transmitted via the third contact and uses the communications interface that corresponds to the communications protocol of the near-field communication (NFC) module.

Thus, even when all three unused contacts of the card are occupied by NFC communication, it is still possible to tell the card to switch from the application processor to the NFC module so as to enable data to be exchanged with the NFC module.

Another aspect of the present invention is directed to a programmable switching device in a mobile terminal including a subscriber smart card and at least first and second electronic modules suitable for communicating with the subscriber smart card using respective first and second communications protocols, wherein the device is connected to said card and to said electronic modules, and the device includes means for selectively connecting at least one contact of the subscriber smart card to the first electronic module or to the second electronic module.

This device placed between the electronic modules and the subscriber smart card enables the modules to be connected in alternation with the contacts of the card, and consequently enables a given contact to exchange signals/data with a plurality of modules in alternation.

The device further includes means for sending a command signal via a contact of the subscriber smart card indicating which communications interface to use, corresponding to the communications protocol of the electronic module for connection to the subscriber smart card.

The device is preferably connected to three contacts of the subscriber smart card corresponding to unused contacts of said card.

Another aspect of the invention is directed to an embedded program (programmable logic) for a programmable switching device such as that described above, and includes instructions for selectively connecting at least one contact of the subscriber smart card to the first electronic module or to the second electronic module.

By means of the program, the switching device can be configured to manage the allocation of the card contacts as a function of the electronic modules that are incorporated in the mobile terminal. The configuration of the switching device is then dynamic and can be adapted at any time.

Another aspect of the invention is directed to a subscriber smart card for placing in a mobile terminal, said card having a plurality of contacts and said mobile terminal further including at least first and second electronic modules suitable for communicating with the subscriber smart card by using respective first and second communications protocols, wherein the card includes at least two communications interfaces corresponding respectively to said first and second communications protocols, and the card includes means for using one or the other of said interfaces via at least one of its contacts in response to an interface configuration command received on another one of its contacts.

Thus, the subscriber smart card of the invention includes communications interfaces enabling data to be exchanged with each of the modules and it is programmed to use the interface that is appropriate for the module that is connected.

When the first electronic module is an application processor using an MMC type communications protocol transmitting data via first and second contacts of the subscriber smart card and transmitting a clock signal via a third contact of said card, and when the second electronic module is a near-field communication (NFC) module using a second communications protocol transmitting data via at least one contact of said card, the card includes means for responding to a variation in the duty ratio of the clock signal transmitted via the third contact by making use, on at least one of the first and second contacts, of the communications interface that corresponds to the communications protocol of the near-field communication (NFC) module.

Thus, even when all three unused contacts of the card are occupied by MMC communication, it is still possible to tell the card to switch from the application processor to the NFC module in order to enable data to be exchanged with the NFC module.

Another aspect of the present invention is directed to a mobile terminal including a subscriber smart card as described above, and at least first and second electronic modules suitable for communicating with the subscriber smart card using respective first and second communications protocols, said terminal further including a programmable switching device as defined above.

A mobile terminal is thus made available that is capable of accommodating a plurality of electronic modules, each requiring the use of one or more of the contacts of the subscriber smart card, but without it being necessary for the contacts of the card to be occupied permanently, and without having recourse to the multiplexing technique.

BRIEF DESCRIPTION OF THE DRAWINGS

The characteristics and advantages of the present invention appear more clearly from the following description made by way of non-limiting indication and given reference to the accompanying drawings, in which.

DETAILED DESCRIPTION OF EMBODIMENTS OF THE INVENTION

The present invention applies to any type of mobile terminal (mobile telephone, communicating PDA, smart phone, etc.) that operate with a subscriber smart card.

Figure 2:
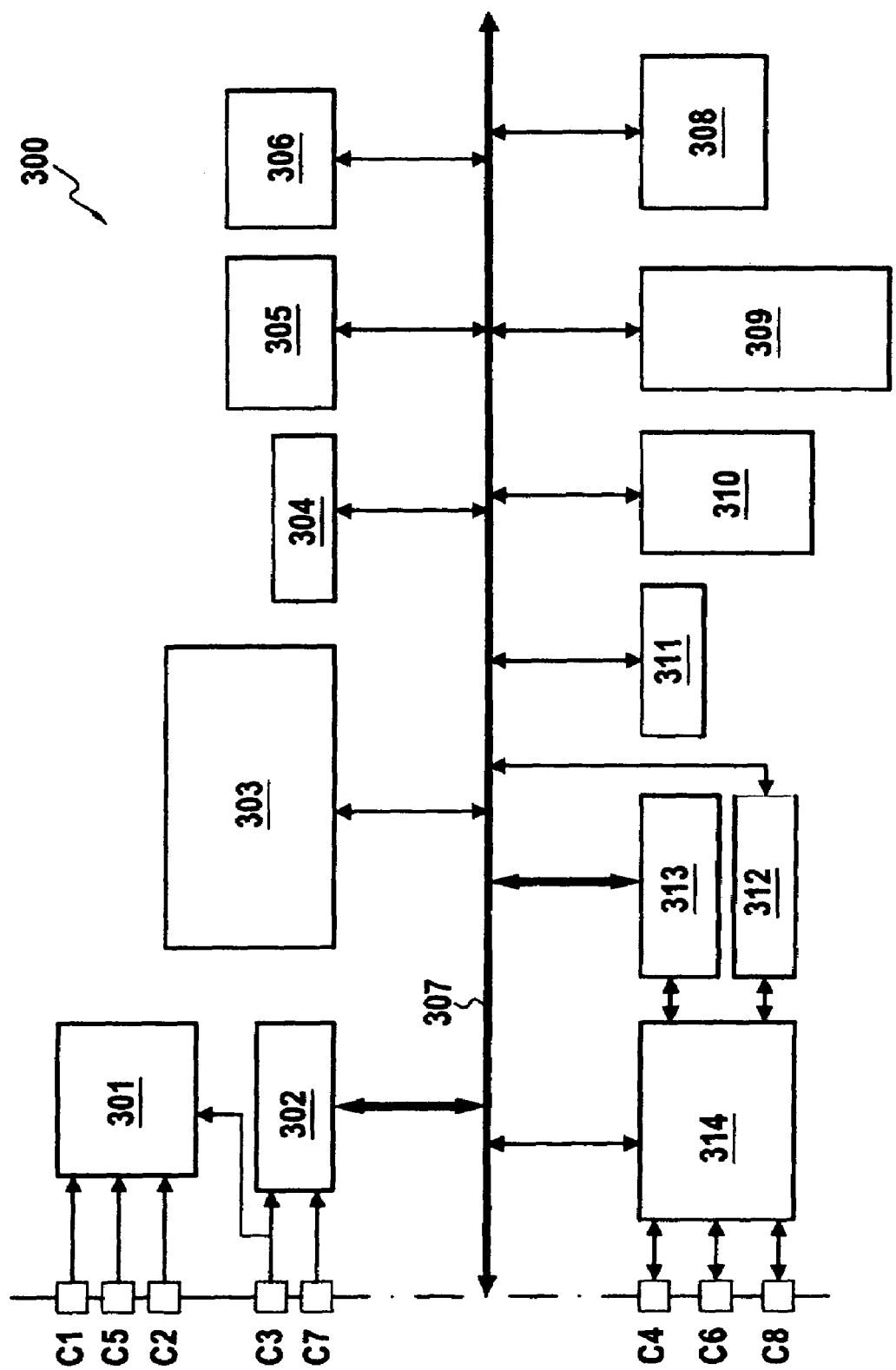
FIG. 2 shows the functional architecture of a subscriber smart card in accordance with an embodiment of the invention.

FIG. 2 shows a functional architecture of a mobile terminal 100 in which the invention can be implemented in accordance with one embodiment.

Figure 1:
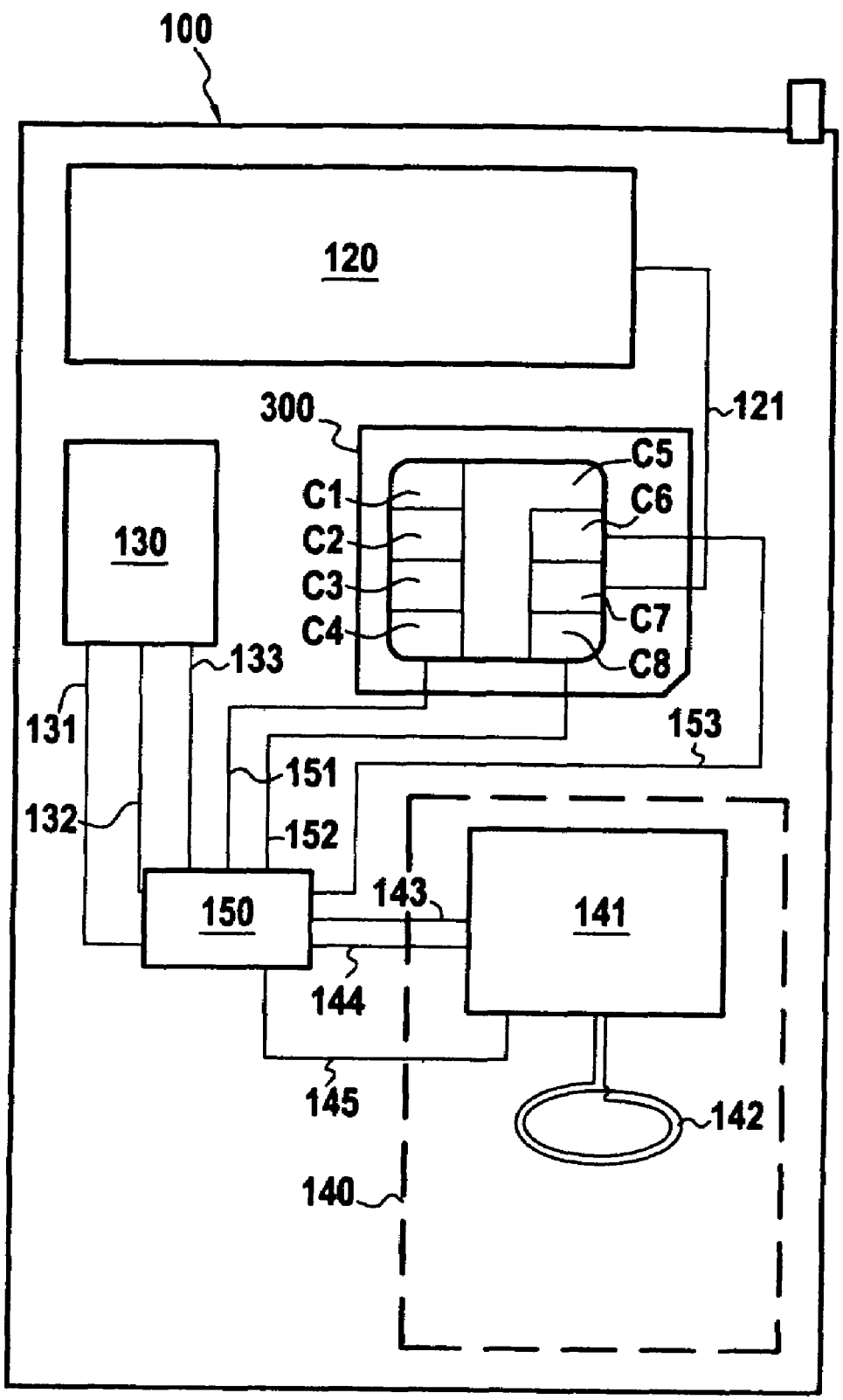
FIG. 1 is a diagrammatic view of the functional architecture of a mobile terminal constituting an embodiment of the invention.

In FIG. 1, the mobile terminal, here a mobile telephone 100, includes a subscriber smart card 300, a digital baseband processor (DBB) 120 enabling data/voice to be sent/received over the mobile telephone network (GSM/GPRS), an application processor 130, a near-field communication (NFC) module 140, and a switching controller 150.

To keep the description simple, the other well-known software/hardware elements of a mobile telephone (user interface (keypad, screen, microphone, loudspeaker), operating system, etc.) are not shown in FIG. 1.

The subscriber smart card 300 (either a subscriber identity module (SIM) card, or a universal subscriber identity module (USIM) card also known as a UMTS integrated circuit card (UICC)) typically has eight contacts C1 to C8 having the following functions allocated thereto according to the ISO 7816-2 standard:

C1=card circuit power supply (VCC);
C2=initialization (reset);
C3=clock (CLK);
C4=reserved for future use (RFU) and not used;
C5=ground (GND);
C6=programming voltage (EEPROM write), not used;
C7=serial input/output connection (ISO 7816 I/O); and
C8=reserved for future use (RFU), not used.

The baseband processor 120 is connected to contact C7 of the subscriber smart card via a connection 121.

The three contacts that are not presently used on the card are the contacts C4, C6, and C8.

FIG. 2 shows a functional architecture for a subscriber smart card 300 that enables the invention to be implemented in the terminal of FIG. 1.

The subscriber smart card 300 comprises:
a clock and power supply manger 301 connected to the contacts C1, C2, C3, and C5;
a serial port controller known as a universal asynchronous receiver-transmitter (UART) 302 that is connected to the contacts C3 and C7;
a processor 303 (32-bit processor);
a timer 304;
an enciphering accelerator 305;
a security controller 306;
a random number generator 308;
a high density memory 309;
a random access memory (RAM) 310;
a read-only memory (ROM) 311;
an NFC interface 312 (e.g. an S2C interface);
a very high speed protocol interface 313 (e.g. a USB or an MMC interface); and
an interface switch 314 connected to the contacts C4, C6, and C8.

All of these elements can exchange data with one another via a bus 307.

In accordance with the invention, and as described in greater detail below, the interface switch 314 serves to switch one or more contacts C4, C6, C8 either to the NFC interface 312 or to the HSP interface 313 as a function of an interface-configuration command delivered by the switching controller 150. The interface switch 314 may be implemented in a relatively simple circuit of the application-specific integrated circuit (ASIC) type.

In FIG. 1, the NFC module 140 is constituted, in known manner, by a chip containing an electronic circuit 141 connected to an NFC antenna 142. The circuit 141 is an NFC modem taking charge of the NFC analog interface and of a communications interface with the mobile telephone. The NFC security component, in this example implemented in the subscriber smart card, comprises a storage memory and processor means (e.g. the high density memory 309 and the processor 303 of the card) in particular to perform the functions of making the exchange of digital information secure, such as functions for cryptography, PIN verification, electronic signature verification, etc.

The circuit 141 comprises analog circuits that serve in known manner to send/receive the digital data contained in or generated by the subscriber smart card via the antenna 142.

The structure and the operation of the NFC module is based in part on that of well-known contactless cards (cf. the near-field communications standard ISO 14443). NFC technology enables the user to access services wirelessly or to exchange information merely by bringing a mobile terminal close to other devices that are NFC compatible (i.e. fitted with an NFC reader or fitted with a proximity coupling device (PCD) compatible with the ISO 14443 standard for the so-called "card emulation" NFC mode), such as interactive terminals, for example. NFC technology is remarkable in that its transmission speed is high (up to 424 kilobits per second (kbit/s)) and its cost is low.

The switching controller 150, which is an element specific to the invention, is formed by way of example by a microcontroller specially programmed, as explained in detail below, to switch in alternation between firstly the subscriber smart card 300 and secondly the application processor 130 or the NFC module 140. A commercially-available component such as 80C51 microcontroller from the supplier Philips™ is entirely suitable for implementing the switching controller 150. Insofar as certain NFC modems already contain a microcontroller, the switching controller could under those circumstances be implemented directly in the NFC modem by programming its microcontroller to perform an additional switching function.

To this end, the switching controller 150 is connected to the application processor 130 via three connections 131 to 133 and to the NFC module 140 via three connections 143 to 145. The switching controller 150 is also connected to the three contacts C4, C6, and C8 of the subscriber smart card 300 via respective connections 151, 153, and 152. The connections 151 and 152 are reserved for exchanging data between the card 300 and the application processor 130 or the NFC module 140, while the connection 153 is reserved for sending interface configuration commands to the card 300 at the time of switching, as described below.

In the embodiment of FIG. 1, provision is made to use two wires for very high speed HSP communication between the application processor 130 of the mobile telephone and the subscriber smart card 300, e.g. using the USB protocol. Similarly, provision is made to use two wires for communication between the NFC module 140 and the subscriber smart card 300, e.g. using the S2C protocol for near field communication. Under such circumstances, the NFC interface 312 and the very high HSP interface 313 of the card correspond respectively to an S2C NFC interface and to a USB interface to enable the contacts C4 and C8 to communicate either by using the S2C protocol or by using the USB protocol.

Figure 3:
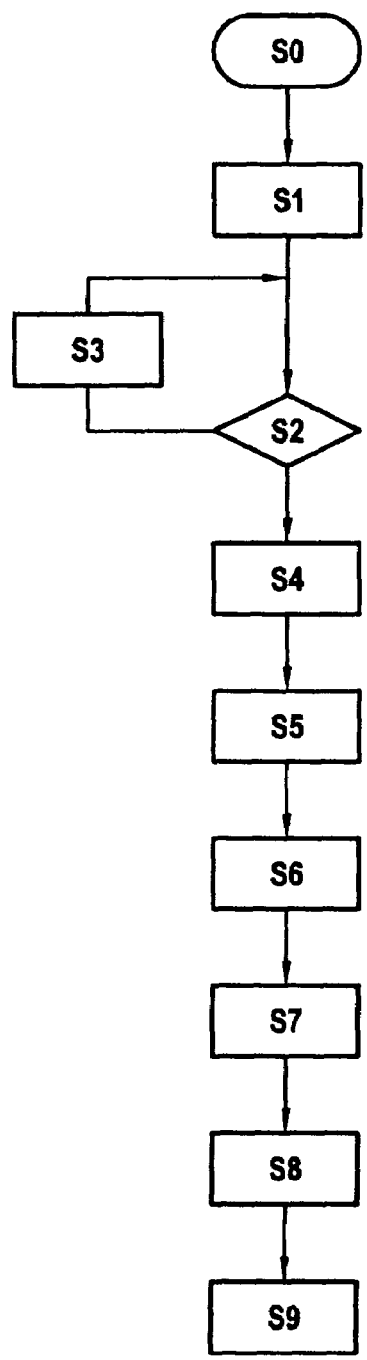
FIG. 3 is a flow chart of an implementation of a method of allocating subscriber smart card contacts in the architecture of FIG. 1.

FIG. 3 shows the steps implemented during a switching operation in accordance with an implementation of the invention.

By default (step S0), the mobile telephone 100 is in "contactless" mode, i.e. the contacts C4 and C8 of the subscriber smart card 300 are connected by default to the NFC modem of the NFC module 140 by the switching controller 150. The NFC module 140 requires response times that are very short (less than 140 milliseconds (ms) for a metro (subway) badge) so it is preferable for the mobile telephone to be in its contactless mode by default.

As soon as the application processor 130 seeks to communicate with the card 300, it sends a request to the switching controller 150 via the connection 133 (step S1). The controller then verifies that no contactless mode transaction is in progress (step S2). If such a transaction is in progress, the controller waits for the end of the transaction (step S3). If there is no contactless transaction in progress or once the transaction has terminated, the controller 150 puts the application processor into connection with the card (interconnecting connections 131 with 151 and 132 with 152) and sends an interface configuration command (step S4) to the contact C6 via the connection 153, to which the subscriber smart card 300 responds by putting itself in "fast interface" mode, i.e. using its USB interface via the contacts C4 and C8 (step S5). More precisely, when the interface switch 314 receives the interface configuration command, it switches the contacts C4 and C8 to the very high speed HSP interface 313 that uses the USB protocol.

Once these operations have been performed, the controller 150 sends information via the connection 133 indicating that the subscriber smart card is ready to exchange data (step S6) with the application processor that is going to send/receive its data via the USB bus formed by the connections 131, 132 and 151, 152 (step S7).

As soon as the application processor 130 has terminated exchanging data, it sends a new message to the switching controller 150 via the connection 133 (step S8), which then returns the subscriber smart card to its contactless mode, i.e. it switches the connections 151 and 152 to the connections 143 and 144 respectively and it sends an interface configuration command via the connection 153, to which the card 300 responds by using its S2C interface via the contacts C4 and C8 (step S9). More precisely, when the interface switch 314 receives the interface configuration command, it switches its contacts C4 and C8 to the NFC interface 312, which uses the S2C protocol.

In the event of a contactless mode transaction initializing (a field being detected) while the application processor is connected to the subscriber smart card, then the NFC modem sends an interrupt request via the connection 145 to the switching controller, which then interrupts the communication between the card and the application processor (relaying the interrupt message to the application processor), and places the subscriber smart card in its contactless mode (in the same manner as in step S9). The application processor can subsequently request to be reconnected (repeating steps S1 to S7).

When used in combination with buffer memories of sufficient size (maximum 1 megabyte (MB)) in the application processor, this solution makes it possible to respond to all circumstances in a manner that is totally transparent for the user of the mobile telephone, particularly since contactless mode transactions are extremely fast and the duration of the interruption is therefore very short.

Figure 4:
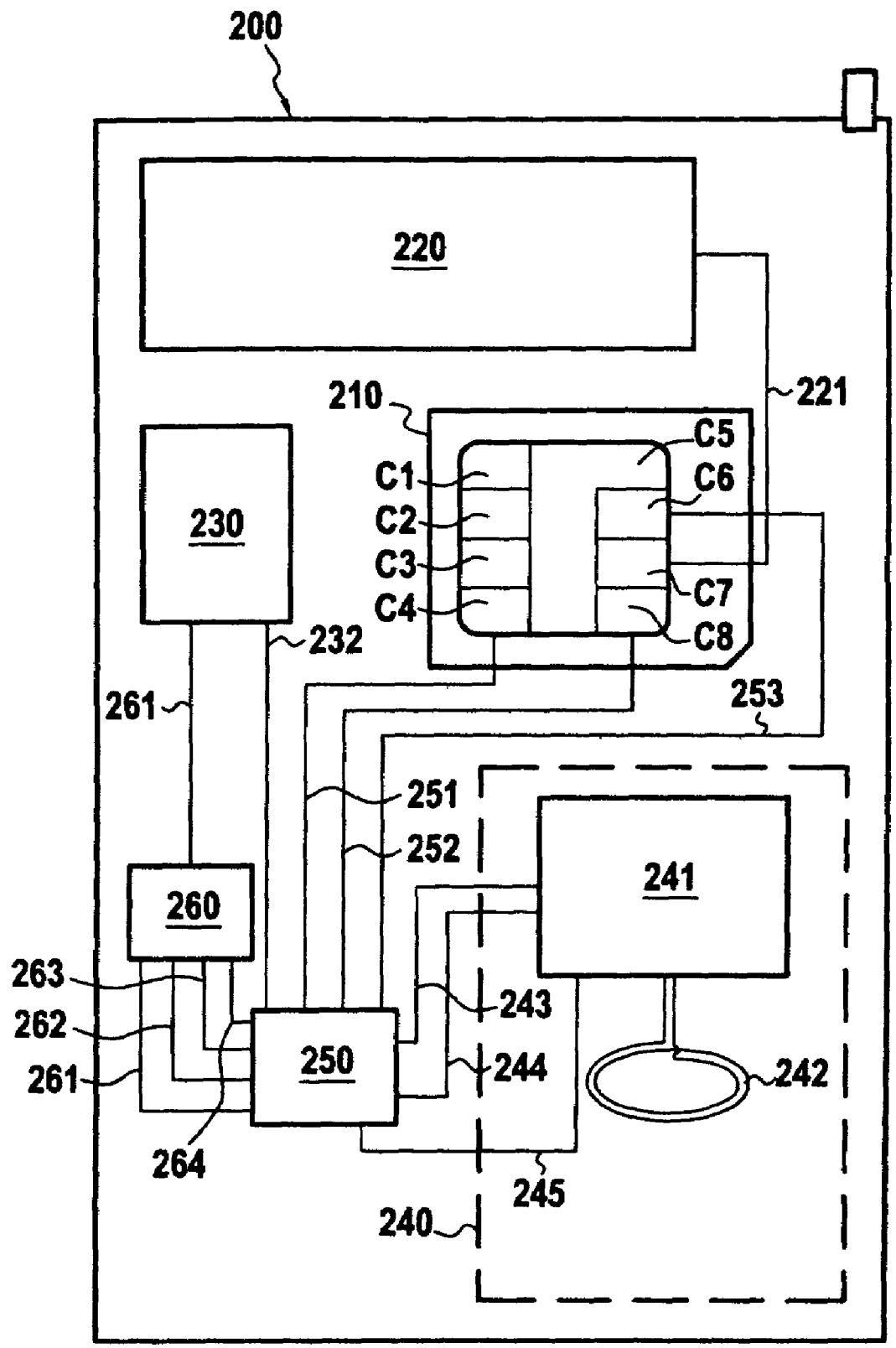
FIG. 4 is a diagrammatic view of the functional architecture of a mobile terminal in accordance with another embodiment of the invention.

There follows a description of another implementation of the present invention in accordance with another embodiment as shown in FIG. 4. The architecture of the mobile telephone 200 differs from that shown in FIG. 1 in that it also includes an MMC driver 260 for exchanging data with the application processor 230 using the multimedia card (MMC) protocol. The other elements of the mobile telephone 200 (subscriber smart card 210, baseband processor 220, application processor 230, NFC module 240, switching controller 250) are similar to those of the mobile telephone 100 of FIG. 1 and are not described again for reasons of simplification. Nevertheless, it should be observed that in this embodiment, since communication between the subscriber smart card 210 and the application processor 230 is implemented using the MMC protocol and not the USB protocol, the card 210 contains an MMC interface replacing the USB interface. This protocol requires the use of three wires (two for data signals and one for the clock signal), so the MMC driver 260 is connected to the switching controller 250 via three connections 261, 262, and 263. In accordance with the MMC protocol, the MMC data signal and the MMC CMD signal are sent respectively via two wires, here the connections 261 and 262, and a clock signal CLX via the third wire, here the connection 263. In rapid interface mode, the MMC data signal data is exchanged via the contact C4 of the card 210 and via the connection 251, and the MMC CMD signal is exchanged via the contact C8 of the card 210 and via the connection 252, while the clock signal CLX is transmitted to the card 210 via the contact C6 and via the connection 253.

The functional architecture of the subscriber smart card 210 is similar to that of the card 300 shown in FIG. 2, with the exception of the interface switch, which further comprises a duty ratio variation detector (a function programmed in the switch) in order to detect a change in the duty ratio on the contact C6 and manage switching of the very high speed HSP interface 313, which in this example corresponds to an MMC interface.

An additional connection 264 is provided between the controller 250 and the MMC driver 260 to enable the interrupt request to be sent thereto.

Furthermore, the switching controller 250 in this example is programmed to connect the three connections 261 to 263 respectively with the three connections 251 to 253 in rapid interface mode and to relay the interrupt request sent by the NFC module to the MMC driver via the connections 245 and 264 in the event of a request to switch to contactless mode.

Figure 5:
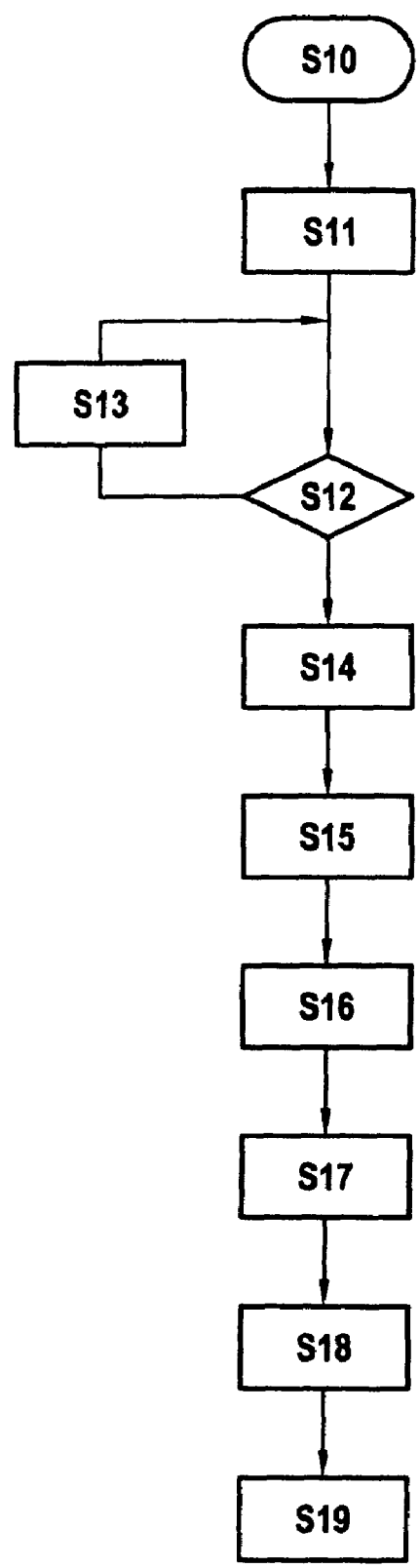
FIG. 5 is a flow chart of an implementation of a method of allocating subscriber smart card contacts in the architecture of FIG. 4.

FIG. 5 shows the steps performed during a switching operation implemented in the FIG. 4 architecture in accordance with an implementation of the invention.

By default (step S10), the mobile telephone 200 is in contactless mode, i.e. the contacts C4 and C8 of the subscriber smart card 210 are connected by default to the NFC modem of the NFC module 240 by the switching controller 250. The NFC module 240 requires response times that are very short (less than 140 ms for a metro badge), so it is preferable to have the mobile telephone in contactless mode by default.

As soon as the application processor 230 seeks to communicate with the card 210, it transmits a request to the switching controller 250 via the connection 232 (step S11). The controller then verifies that no contactless mode transaction is in progress (step S12). If a transaction is in progress, then the controller waits until the end of the transaction (step S13).

If there is no contactless transaction in progress or once the transaction has terminated, the controller 250 sends an interface configuration command (step S14) to the contact C6 via the connection 253, and the subscriber smart card 210 responds thereto by putting itself into MMC fast interface mode. More precisely, when the interface switch 314 receives the interface configuration command, it switches the contacts C4, C6, and C8 to the very high speed HSP interface 313, which in this example uses the MMC protocol. The controller 250 puts the application processor 230 into communication with the card 210 via the MMC driver 260 by connecting the connection 261 to the connection 251, the connection 262 to the connection 252, and the connection 263 to the connection 253 (step S15). Once these operations have been performed, the controller 250 sends information to the application processor 230 via the connection 232 indicating that the subscriber smart card is ready to exchange data (step S16), and the application processor 230 will then send/receive data using the MMC protocol via the bus formed by the connections 261 to 263 and 251 to 253 (step S17).

As soon as the application processor 230 has finished exchanging data, it sends a new message to the switching controller 250 via the connection 232 (step S18) which then returns the subscriber smart card to its contactless mode (i.e. it connects the connections 251, 252 respectively to the connections 243, 244 and it sends an interface configuration command via the connection 253, to which the interface of the card 210 responds by switching the NFC interface that uses the S2C protocol to the contacts C4 and C8) (step S19).

While the subscriber smart card 210 is exchanging data with the application processor 230 using the MMC protocol in fast interface mode (step S17), the contact C6 is used by the clock signal CLX of the MMC protocol. It is therefore necessary to define some mechanism suitable for enabling the subscriber smart card 210 to return to contactless mode, should that be necessary.

When a contactless mode transaction initializes (a field is detected) while the application processor 230 is connected to the subscriber smart card 210, the NFC modem 240 sends an interrupt request via the connection 245 to the MMC driver 260 passing via the switching controller 250 that forwards the request to the MMC driver via the connection 264.

On receiving the interrupt request, the MMC driver 260 changes the duty ratio of the clock signal (CLX) and stops sending data via the contacts C4 (MMC data signal) and C8 (MMC CMD signal). The interface switch of the subscriber smart card is programmed to detect changes in the duty ratio of the clock signal and to pass into contactless mode on detecting such a change, i.e. switch the contacts C4 and C6 to the NFC interface that uses the S2C protocol.

Figure 6:
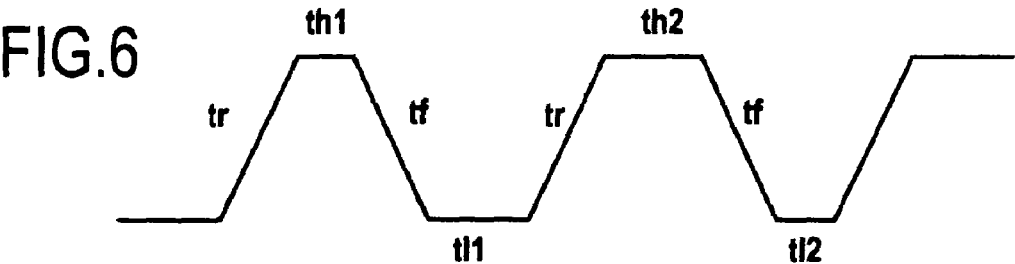
FIG. 6 is a diagram showing an example of variation in the duty ratio of a clock signal in the MMC protocol.

By way of example, and as shown in FIG. 6, for an MMC clock signal at 20 megahertz (MHz), the following values are accepted by the MMC standard: a first cycle with tr=10 nanoseconds (ns); th1=100°sns, tf=100°sns, tl1=200°sns (ratio of the duration of the high state of the signal over the signal period or (duty ratio=40%), followed by a second cycle with tr=100°sns, th2=200°sns, tf=100°sns, and tl2=100°sns (duty ratio=60%). This gives a duty ratio that varies from 60% to 40% and that is quite easily detectable by the interface switch of the subscriber smart card.

The subscriber smart card then detects the change in duty ratio on its contact C6 and returns to contactless mode (i.e. the interface switch switches the NFC interface that uses the S2C protocol to the contacts C4 and C8 while the switching controller connects the connections 251, 252 with the connections 243, 244 respectively).

Other ways of allocating the contacts C4, C6, and C8 are possible within the invention. They depend on the protocols/interfaces used for exchanging data between the subscriber smart card and the other elements of the mobile telephone (application processor, NFC module, etc.).

By way of example, when the application processor communicates with the subscriber smart card using the MMC protocol while the NFC module communicates with the card using the single wire protocol (SWP) that requires only one wire, the implementation described above with reference to FIGS. 4 to 6 can be applied with the sole exception that contactless mode uses only one wire (e.g. omitting the connection 244 in FIG. 4 and transmitting data between the NFC module and the card via connections 243 and 251).

The invention claimed is:
1. A contact allocation method for a subscriber smart card configured to be fitted in a mobile terminal, wherein the subscriber smart card comprises first and second interface modules suitable for communicating with the mobile terminal using respective first and second communication protocols, the method comprising:

selectively connecting at least one contact of the subscriber smart card to the first interface module, wherein a default connection for the at least one contact is being connected to the second interface module;

receiving by the subscriber smart card via a first contact of the at least one contact, an interface configuration command corresponding to the first or second communication protocol of the respective first or second interface module that is to be connected with the mobile terminal card, wherein the first communication protocol comprises a multi media card (MMC) protocol configured to communicate on three of the at least one contacts, and wherein the second communication protocol is configured to communicate on the at least the second contact and the third contact;

communicating data by the first interface module, according to the MMC protocol on the second contact and third contact;

receiving, by the subscriber smart card, a clock signal on the first contact; and responding by the subscriber smart card to a duty ratio change in the clock signal received from the mobile terminal by connecting the NFC interface module to at least the first contact and the second contact so as to communicate with the mobile terminal according to the second communication protocol of the NFC interface module.

2. A mobile terminal configured for installation of a subscriber smart card comprising a plurality of contacts, the mobile terminal comprising:

at least first and second electronic modules suitable for communicating with the subscriber smart card using respective first and second communication protocols; and a programmable switch controller configured to connect to the plurality of contacts of the subscriber smart card and connected to said electronic modules, wherein the programmable switch controller is configured to connect at least one contact of the plurality of contacts from the second electronic module to the first electronic module after the programmable switch controller receives a request to connect from the first electronic module and after the second electronic module completes a communication with or when there is no communication between the second electronic module and the subscriber smart card via the second communication protocol, wherein the programmable switch controller is configured to disconnect the at least one contact from the first electronic module and connect the at least one contact to the second electronic module when the first electronic module is communicating with the subscriber smart card via the first communication protocol and the programmable switch controller receives an interrupt from the second electronic module and the interrupt is relayed to first electronic module, and wherein the programmable switch controller is configured to connect the at least one contact of the plurality of contacts to the second electronic module as a default.

3. The mobile terminal according to claim 2, wherein the programmable switch controller is further configured to connect a command signal to a predetermined contact of the plurality of contacts, the command signal configured to indicate which of the first or second communication protocols is to be communicated on the at least one contact of the plurality of contacts.

4. The mobile terminal according to claim 2, wherein the plurality of contacts consist of 2 or 3 contacts and wherein the plurality of contacts are a subset of a total number of contacts on the subscriber smart card.

5. A subscriber smart card configured for placing in a mobile terminal, the subscriber smart card comprising:

a plurality of contacts;

a particular contact;

first and second communication interface modules configured to communicate with first and second electronic modules of the mobile terminal using respective first and second communication protocols and requiring respective first and second different connection configurations when the subscriber interface card is installed as configured in the mobile terminal;

an interface switch module connected between the plurality of contacts and the first and second communication interface modules, the interface switch module configured to connect at least one of the plurality of contacts to the first or the second communication interface modules in response to an interface configuration command received on the particular contact wherein the first electronic module is an application processor and the first communication protocol is an MMC type communications protocol, the subscriber smart card configured to communicate data with the first electronic module via first and second contacts of the plurality of contacts and configured to receive a clock signal via the particular contact, wherein the second electronic module is a near-field communication module, the subscriber smart card being further configured to communicate data with the second electronic module via at least one contact of the plurality of contacts, and wherein the interface switch module further comprises a duty ratio variation detector configured to detect a variation in the duty ratio of the clock signal received on the particular contact and use the detected variation as the configuration command.

6. A subscriber smart card configured to be embedded in a mobile terminal, the subscriber smart card comprising:

a plurality of contacts allocated for predetermined connections with the mobile terminal, the plurality of contacts comprising a subset of contacts configured for connection to a first electronic module and a second electronic module of the mobile terminal, the subscriber smart card being configured for communicating with the first and second electronic modules in alternation according to a first communication protocol and a second communication protocol, respectively;

an interface switch connected to the subset of the contacts, the interface switch configured to receive one of an interface configuration command and a clock signal from a first one of the subset of contacts;

a first interface module connected to the interface switch, the first interface module is configured to communicate with the mobile terminal according to the first communication protocol;

a second interface module connected to the interface switch, the second interface module is configured to communicate with the mobile terminal according to the second communication protocol;

wherein the interface switch is further configured to connect at least one contact of the subset of contacts to the first interface module or to the second interface module in response to receipt of the interface configuration command or detection of a duty ratio change in the clock signal on the first one of the subset of contacts when the subscriber smart card is embedded in the mobile terminal.

7. The subscriber smart card of claim 6, wherein the subset of contacts consists of three contacts.

8. The subscriber smart card of claim 6, wherein the first communication protocol comprises one of a universal serial bus (USB) protocol and a multi media card (MMC) protocol.

9. The subscriber smart card of claim 6, wherein the second communication protocol comprises a secure IC to secure near-field communications (S2C) protocol.

10. A mobile terminal configured to have a subscriber smart card embedded therein, the mobile terminal comprising:
- a plurality of connections allocated to electrically connect to a plurality of contacts on the subscriber smart card when the subscriber smart card is embedded in the mobile terminal, the plurality of connections comprising a subset of connections configured to communicate with an interface module of the subscriber smart card;
- an application processor configured to communicate on one or more connections of the subset of connections according to a first communication protocol;
- a near-field communication (NFC) module configured to communicate on the one or more connections according to a second communication protocol;
- a switch controller connected to the one or more connections, to the application processor and to the NFC module, the switch controller configured to send an interface configuration command to the subscriber smart card on a first connection of the subset of connections;
- wherein the switch controller, by default, connects the NFC module to the one or more connections;
- wherein the switch controller is configured to connect the application processor to the one or more connections when the switch controller receives a request to connect from the application processor and the NFC module is not communicating with the subscriber smart card or after the NFC module completes a communication with the subscriber smart card via the second communication protocol;
- wherein the switch controller is configured to disconnect the application processor from the one or more connections and connect the NFC module to the one or more connections when the application processor is communicating with the subscriber smart card via the first communication protocol and both the programmable switch controller and the first application processor receive an interrupt originating from the NFC module.

11. The mobile terminal of claim 10, wherein the first communication protocol comprises one of a High Speed Protocol (HSP).

12. The mobile terminal of claim 10, wherein the first communication protocol comprises a multi media card (MMC) protocol and wherein the interface configuration command is comprises a duty ratio of a clock signal.

* * * * *

UNITED STATES PATENT AND TRADEMARK OFFICE
CERTIFICATE OF CORRECTION

PATENT NO. : 8,364,203 B2
APPLICATION NO. : 12/226084
DATED : January 29, 2013
INVENTOR(S) : Thierry Morel et al.

It is certified that error appears in the above-identified patent and that said Letters Patent is hereby corrected as shown below:

Col. 5, line 65, delete "FIG. 2" and insert therefor --FIG. 1--

Signed and Sealed this
Ninth Day of April, 2013

Teresa Stanek Rea
*Acting Director of the United States Patent and Trademark Office*